No. 630,635. Patented Aug. 8, 1899.
A. SUNDH.
PROTECTIVE CASING FOR ELECTRIC CABLES OR WIRES.
(Application filed Mar. 28, 1899.)

(No Model.)

WITNESSES
L. Almquist.
C. Sedgwick.

INVENTOR
August Sundh
BY
A. P. Thayer
ATTORNEY

THE NORRIS PETERS CO., PHOTO-LITHO., WASHINGTON, D. C.

UNITED STATES PATENT OFFICE.

AUGUST SUNDH, OF YONKERS, NEW YORK.

PROTECTIVE CASING FOR ELECTRIC CABLES OR WIRES.

SPECIFICATION forming part of Letters Patent No. 630,635, dated August 8, 1899.

Application filed March 28, 1899. Serial No. 710,767. (No model.)

*To all whom it may concern:*

Be it known that I, AUGUST SUNDH, a citizen of the United States of America, and a resident of Yonkers, county of Westchester, and State of New York, have invented certain new and useful Improvements in Protective Casings for Electric Cables or Wires, of which the following is a specification.

My invention relates to the exterior metallic protective casing for the cable or wires; and it consists of the said casing constructed of coiled metal strips in the manner hereinafter described, so as to be flexible and at the same time capable of tensile strength to resist being pulled apart in handling, placing, and in other ways in which it may be subject to such stresses, also so as to be nail-proof to protect the cable or wires from nails when placed in the walls of buildings, as follows, reference being made to the accompanying drawings, in which—

Figure 1:
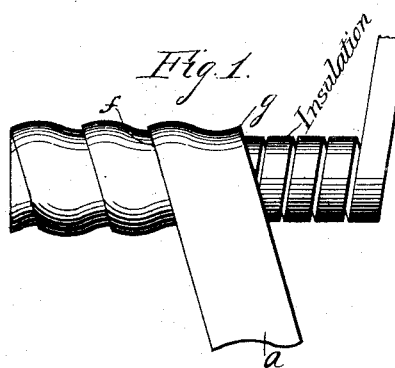
Figure 2:
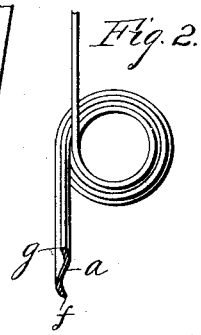
Figure 3:
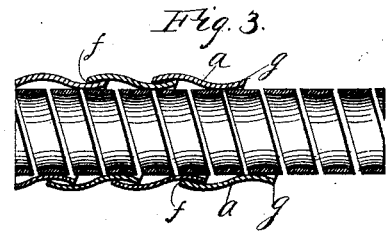
Figure 4:
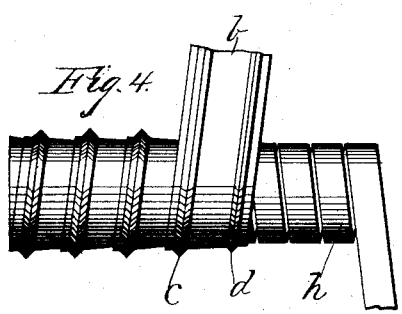
Figure 5:
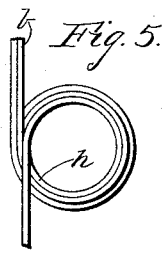
Figure 6:
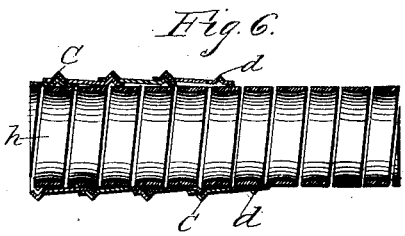
Figure 7:
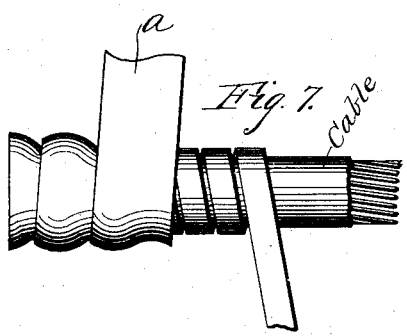
Figure 8:
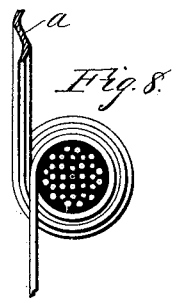
Figure 9:

Figure 1 is a side elevation of a short section of the protective portion of a cable constructed in accordance with my invention. Fig. 2 is an end view, and Fig. 3 a longitudinal section of the structure of Fig. 1. Fig. 4 is a side view, Fig. 5 an end view, and Fig. 6 a longitudinal section, of a casing in a modified form of construction; and Fig. 7 is a side view, Fig. 8 an end elevation, and Fig. 9 a longitudinal section, of the casing with a short section of cable inserted in it.

The essential feature of the invention consists of a strip grooved and ribbed or otherwise contrived along the margins, respectively, and spirally wound, with one margin overlapping the other in such manner that a tube is formed with interlocking coils that is flexible but will not pull apart by such tensile stresses as such casings may be subject to in handling, placing, removing, and replacing, where it has to be drawn into and out of positions between floors, partitions, and the like in buildings.

The invention also comprises a reinforcing inner plain flat coil in addition thereto for greater strength of the casing and having oval or roundish edges of the inner surfaces of the coils to prevent cutting or otherwise damaging the cable or wires when drawing in and out of the casing and when the casing is bent or coiled.

The ribbed and grooved interlocking strip may have the rib and groove produced in different forms. For example, the strip $a$, Figs. 1, 2, 3, 7, 8, and 9, may be made in ogee form in cross-section, or the strip $b$, Figs. 4, 5, and 6, may have a V or equivalent groove, as $c$, on its inner side and a like but smaller rib $d$ on the outside, so that the coils will intermesh when overlapped, as shown. While the ogee strip presents to the view a ribbed and grooved form on each side and the strip $b$ presents two grooves on one side and two ribs on the other side, the intermeshing and interlocking of the overlapped coils is practically the same. The contracted or reëntrant edge $f$ of the ogee strip "hooks over," so to speak, the expanded or salient edge $g$ of the preceding coil in practically the same way as the groove $c$ of strip $b$ engages the rib $d$ of the preceding coil of said strip. The rib of the outside of strip $b$ is smaller than the inside groove for intermeshing to better advantage and for greater flexibility.

To make the inside of the casing smoother and less obstructive to the cables or wires being drawn in and out than if consisting of the outer strip only and also to make the casing more substantial, a plain flat coiled strip liner $h$ is employed, the outer strip being coiled on it, and this strip is made with the roundish inside form shown to protect the cable or wires from damage liable to result from the more angular edges that the strip of flat form would present against them when the casing is bent in handling or in turning out of the straight course, as when coiled for transportation or in turning corners in buildings and the like; but the inner coil may consist of a strip of insulating material, as braided asbestos or other material, if desired. While I have represented only one strip $a$ or $b$ so coiled in the construction of the casing, it is manifest that two or more may be coiled at the same time, the strips overlapping each other to begin with. In such case the pitch of the coils will be longer. It will be seen that such an overlapping and interlocking casing will be puncture-proof so far as the ordinary liabilities of puncture are concerned besides all the advantages of flexibility, and with fire-resisting lining, as asbestos, it is substantially fireproof.

While I have represented the underlying one of the lapped margins as having the rib and the overlapping one as having the groove, it is manifest that a construction in which these conditions are reversed will be practically the same so far as the purpose and function of the invention are concerned; and instead of the groove and rib for effecting the interlocking it is plain that any form of protuberance on one margin and reëntrant part on the other margin adapted to intermesh when the strip is wound or coiled will be the equivalent of the rib and groove.

What I claim as my invention is—

1. A flexible metallic casing for electric cables or wires consisting of a spirally-wound overlapped strip, the overlapped margins of which are interlocked by an intermeshing rib of one side and a groove of the other.

2. A flexible metallic casing for electric cables or wires consisting of a spirally-wound overlapped strip, the overlapped margins of which are interlocked by protuberant and reëntrant parts of the respective margins intermeshing with each other, and an inner reinforcing plain coiled strip.

3. A flexible metallic casing for electric cables or wires consisting of a spirally-wound overlapped strip, the overlapping margins of which are interlocked by protuberant and reëntrant parts of the respective margins intermeshing with each other, and an inner reinforcing plain coiled strip having an oval inner face.

4. In a flexible spirally-wound metallic strip casing for electric cables, a coiled strip forming the inner wall of the casing and having an oval face.

Signed by me, at New York, N. Y., this 25th day of March, 1899.

AUGUST SUNDH.

Witnesses:
C. SEDGWICK,
J. HOWARD.